னtates Patent Office 2,864,822
Patented Dec. 16, 1958

2,864,822
9-AMINO-7-METHYL-Δ¹⁰-ERGOLENE AND DERIVATIVES THEREOF

Eugene J. Fornefeld and Edmund C. Kornfeld, Indianapolis, Ind., assignors to Eli Lilly and Company, Indianapolis, Ind., a corporation of Indiana No Drawing. Application October 22, 1956
Serial No. 617,244

9 Claims. (Cl. 260—285.5)

This invention relates to substituted ergolenes and more particularly to 9-amino-7-methyl-Δ¹⁰-ergolene and certain carboxyacyl derivatives thereof, and to processes for the preparation of the new compounds.

For illustrative purposes a conventional structural formula of 9-amino-7-methyl-Δ¹⁰-ergolene of this invention is given below:

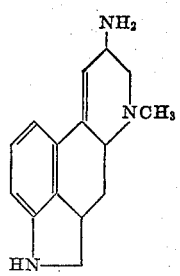

The various compounds of the invention and their interrelationships, as well as a broad outline of the processes for their preparation, are illustrated by the following series of equations, wherein R represents a lower alkyl radical, i. e., one having from one to eight carbon atoms, or a monocarbocyclic aromatic radical.

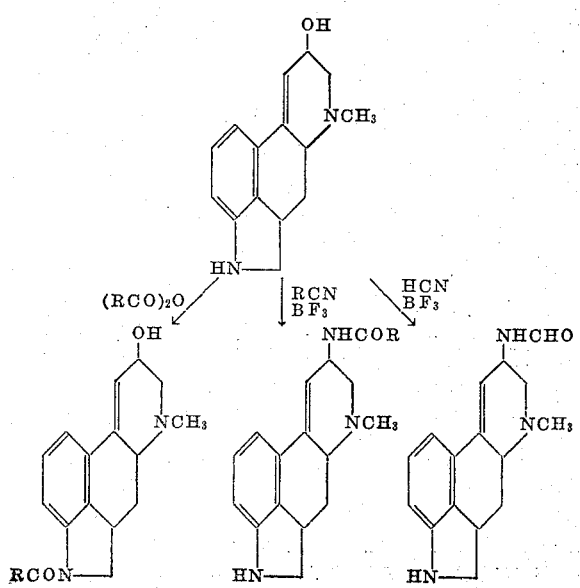

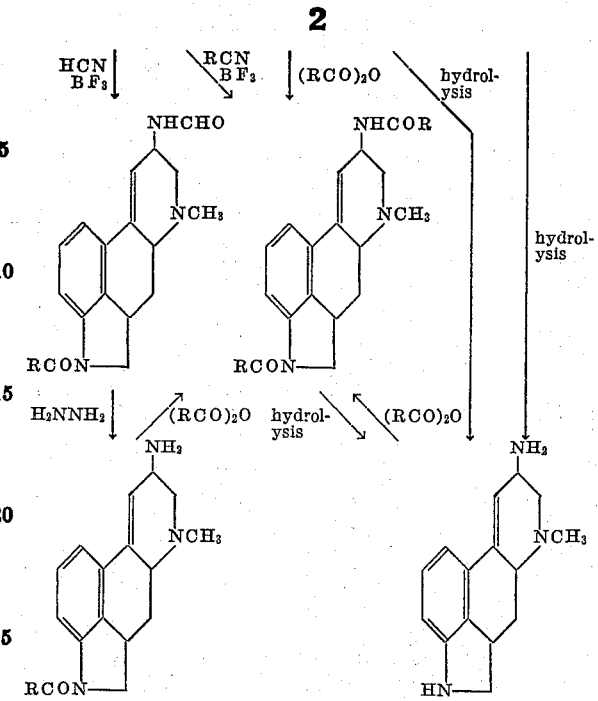

Thus, for example, and referring to the equations set forth above, the novel compounds of the invention can be prepared by treating 9-hydroxy-7-methyl-Δ¹⁰-ergolene with hydrogen cyanide in the presence of boron trifluoride at a temperature in the range of about 20° to 30° C. to form the corresponding 9-formamido-7-methyl-Δ¹⁰-ergolene, which is hydrolyzed to form 9-amino-7-methyl-Δ¹⁰-ergolene. The latter compound can be carboxyacylated by the usual methods using an acylating agent such as an acid anhydride or the like to produce the desired 4,9-diacyl-9-amino-7-methyl-Δ¹⁰-ergolene. Alternatively, a 4-acylated-9-hydroxy-7-methyl-Δ¹⁰-ergolene can similarly be treated with hydrogen cyanide in the presence of boron trifluoride to produce the corresponding 4-acylated-9-formamido-7-methyl-Δ¹⁰-ergolene. Treatment of this compound with hydrazine removes the formyl group yielding the corresponding 4-monoacyl-9-amino-ergolene compound, which by reaction with the selected carboxyacylating agent produces a 4,9-diacyl-9-amino-7-methyl-Δ¹⁰-ergolene. By treating 9-hydroxy-7-methy-Δ¹⁰-ergolene or its 4-carboxyacyl derivatives with a substituted nitrile in the presence of boron trifluoride, there are produced corresponding 9-acylamido-7-methyl-Δ¹⁰-ergolenes and 4-acyl-9-acylamido-7-methyl-Δ¹⁰-ergolenes, respectively. The acyl groups can be removed from the mono- or di-acylated aminoergolenes by hydrolysis to yield 9-amino-7-methyl-Δ¹⁰-ergolene.

Included within the scope of this application are 9-amino-7-methyl-Δ¹⁰-ergolene, alkyl-substituted N-carboxyacyl derivatives thereof, the alkyl groups of which have from one to eight carbon atoms, and monocarbocyclic aromatic-substituted N-carboxyacyl derivatives thereof, and certain 9-formamido-7-methyl-Δ¹⁰-ergolenes which are intermediate compounds for the preparation thereof, as well as the processes for the preparation of the novel compounds.

The 9-amino-7-methyl-$\Delta^{10}$-ergolene and N-carboxyacyl derivatives thereof have useful physiological action. They produce contraction of the uterus similar to that obtained with ergonovine; thus, when employed in the same way as ergonovine, they are characterized by their oxytocic activity. Further, when administered parenterally, the compounds have hypothermic activity and therefore can be used to lower the body temperature. They exert certain action upon the central nervous system of mammals and are useful drugs for the study of mental disease.

The following examples more specifically illustrate the novel compounds and the processes for their preparation.

EXAMPLE 1

*Preparation of 9-formamido-7-methyl-$\Delta^{10}$-ergolene*

A mixture of 118 g. (0.4 mol) of N-benzoylindoline-3-propionic acid (prepared according to the method of Robinson, J. Chem. Soc., 1931, 3158) and 200 ml. of thionyl chloride is allowed to stand at room temperature for one-half hour, and thereafter is warmed gently on a steam bath for about twenty minutes. The excess thionyl chloride is evaporated in vacuo, and the residue, comprising N-benzoylindoline-3-propionyl chloride, is dissolved in 200 ml. of dry carbon disulfide. The solution is added in a thin stream to a vigorously stirred suspension of 240 g. of aluminum chloride in 1750 ml. of carbon disulfide. The mixture is refluxed and stirred for one hour and treated with a mixture of 500 g. of ice, 250 ml. of concentrated hydrochloric acid, and 500 ml. of water. The mixture is stirred during the addition of the ice mixture, and is cooled by intermittently distilling a portion of the carbon disulfide in vacuo. After addition of all of the ice mixture, the carbon disulfide remaining is distilled in vacuo and the aqueous residue is extracted with two liters of benzene. The benzene extract is washed with dilute sodium hydroxide solution, dried over magnesium sulfate, and evaporated in vacuo to a small volume. Several volumes of petroleum ether are added slowly to the concentrate whereupon a yellow crystalline precipitate of N-benzoyl-5-keto-1,2,2a,3,4,5-hexahydrobenz[cd]indole separates. The precipitate is filtered off, washed with petroleum ether, and recrystallized from benzene-petroleum ether mixture. After recrystallization from benzene-petroleum ether mixture, it melts at about 146–147° C.

A solution of 304.7 g. (1.1 mol) of N-benzoyl-5-keto-1,2,2a,3,4,5-hexahydrobenz[cd]indole in 2200 ml. of glacial acetic acid is warmed to about 40° C. The reaction mixture is illuminated with a 250 watt bulb, and 352 g. (1.1 mols) of pyridine hydrobromide perbromide are added in portions during a period of about five minutes, with shaking. The reaction mixture is warmed to about 60° C. and kept at about 55–60° C. for about thirty minutes. The mixture is then treated with activated charcoal, filtered and evaporated to small volume in vacuo. The residue is dissolved in 2200 ml. of chloroform, the solution is washed several times with water, and dried over magnesium sulfate. The solvent is then removed by evaporation in vacuo. The residue is crystallized from 2200 ml. of 1:1 mixture of acetic acid and ether. N-benzoyl-4-bromo-5-keto-1,2,2a,3,4,5-hexahydrobenz[cd]indole thus prepared melts at about 180.5–181.5° C.

A mixture of 1200 ml. of liquid methylamine and 300 g. of chloroacetone ethylene ketal is heated in a high pressure autoclave at 160–165° C. for about twenty-five hours. The reaction mixture is cooled and the excess methylamine is evaporated. The residue, comprising methylaminoacetone ethylene ketal, is dissolved in several volumes of ether. The ether solution is mixed with a solution of 130 g. of potassium hydroxide in 65 ml. of water, and is decanted from the sludge. The ethereal extract containing methylaminoacetone ethylene ketal formed in the reaction is dried over solid potassium hydroxide, the ether is removed by evaporation, and the residue is distilled. The portion boiling at 158–162° C. is collected, dissolved in two liters of dry ether and dry hydrogen chloride gas is passed into the solution until precipitation of the hydrochloric acid addition salt of the base is complete. The methylaminoacetone ethylene ketal hydrochloride thus prepared melts at about 165–167° C. It can be represented by the formula

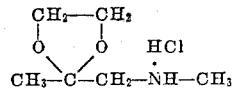

The methylaminoacetone ethylene ketal hydrochloride is suspended in one liter of dry ether, and to the mixture is added with stirring a solution of 110 g. of potassium hydroxide in 55 ml. of water. Sufficient excess solid potassium hydroxide is added to render the ether anhydrous, the ether layer is decanted, and the ether is evaporated. The residue is distilled yielding methylaminoacetone ethylene ketal which boils at about 158–159° C.

A mixture of 270 g. (0.76 mol) of N-benzoyl-4-bromo-5-keto-1,2,2a,3,4,5-hexahydrobenz[cd]indole, 307 g. (2.35 mols) of methylaminoacetone ethylene ketal and 4500 ml. of dry benzene is refluxed under an atmosphere of nitrogen for about twenty-one hours. The reaction mixture is cooled, and the precipitate of methylaminoacetone ethylene ketal hydrobromide which separates from solution is removed by filtration. The filtrate is washed several times with one-liter portions of ice water, and then is extracted with three successive one-liter portions of cold dilute hydrochloric acid, each containing 150 ml. of 37 percent HCl. The acid extract is immediately added to an excess of ice-cold dilute sodium hydroxide solution. The alkaline mixture is extracted with about one liter of chloroform, and the chloroform solution is dried over magnesium sulfate and decolorized with activated carbon. The decolorized chloroform solution is evaporated in vacuo to remove the chloroform. The residue, consisting of N-benzoyl-5-keto-4-(N-methyl-N-acetonyl)-amino-1,2,2a,3,4,5-hexahydrobenz[cd]indole ethylene ketal, is crystallized from acetone. It melts at about 135–137° C.

A solution of 20 g. of N-benzoyl-5-keto-4-(N-methyl-N-acetonyl)-amino-1,2,2a,3,4,5-hexahydrobenz[cd]indole ethylene ketal in a mixture of 250 ml. of concentrated hydrochloric acid and 250 ml. of water is kept under an atmosphere of nitrogen at a temperature of 37° C. for about five days. The mixture is then cooled, treated with decolorizing carbon and filtered. The filtrate is concentrated to small volume in vacuo, and the residue containing the non-volatile portion of the reaction mixture, including 5-keto-4-(N-methyl-N-acetonyl)-amino-1,2,2a,3,4,5-hexahydrobenz[cd]indole in salt form, is treated with an excess of solid sodium bicarbonate. The alkaline residue is then extracted with three 100 ml. portions of chloroform. The combined chloroform extracts are evaporated to dryness in vacuo at room temperature. The dry residue is collected, powdered and slurried with about 75 ml. of a mixture of equal parts of benzene and ether. The benzene-ether solvent mixture is removed by filtration, leaving the solid, crystalline 5-keto-4-(N-methyl-N-acetonyl)-amino-1,2,2a,3,4,5-hexahydrobenz[cd]indole which melts at about 105–107° C. After recrystallization from a mixture of benzene and ether, the compound melts at about 109–110° C.

Ten grams of 5-keto-4-(N-methyl-N-acetonyl)-amino-1,2,2a,3,4,5-hexahydrobenz[cd]indole are dissolved in 400 ml. of absolute alcohol while stirring under nitrogen at about 40° C. The solution is cooled to about −20° C. and three equivalents of sodium methoxide are added thereto. The solution is stirred at about −10° C. for about ten minutes during which time a crystalline precipitate of the desired product forms. The crystalline material is removed by filtration, and washed with successive portions of cold water, methanol and ether. The 9-keto-7-methyl-$\Delta^{10}$-ergolene thus prepared melts at about 145–147° C.

A mixture of 10 g. of 9-keto-7-methyl-$\Delta^{10}$-ergolene, 10 ml. of water and 200 ml. of methanol is treated with 1.5 g. of sodium borohydride. The mixture is stirred for about two hours, and then diluted with 150 ml. of methanol and 25 ml. of water. The aqueous mixture is heated to boiling, and treated with decolorizing carbon. The decolorized solution is concentrated to small volume in vacuo. A precipitate, consisting of 9-hydroxy-7-methyl-$\Delta^{10}$-ergolene, is formed. It is removed by filtration, washed with water and methanol and dried. The 9-hydroxy-7-methyl-$\Delta^{10}$-ergolene melts with decomposition at about 210–220° C.

To a suspension of 5 g. of 9-hydroxy-7-methyl-$\Delta^{10}$-ergolene in 500 ml. of liquid hydrogen cyanide, while cooling in ice, are slowly added 200 ml. of boron trifluoride etherate. After addition of all of the boron trifluoride, the reaction mixture is kept at about 25° C. for about sixteen hours, nd then the excess hydrogen cyanide is removed by evaporation in vacuo. To the thick syrup which remains are added approximately 100 ml. portions of water and chloroform, and the resulting mixture is neutralized by the addition of solid sodium bicarbonate. The 9 - formamido - 7 - methyl - $\Delta^{10}$-ergolene which forms in the reaction is crystallized and removed by filtration. The crystalline mixture is digested with about 25 ml. of hot water, filtered and washed with water. The product is recrystallized from a mixture of dimethylformamide and methanol.

9-formamido-7-methyl-$\Delta^{10}$-ergolene thus prepared melts with decomposition at about 242–244° C.

*Analysis.*—Calculated for $C_{16}H_{19}N_3O$: C, 71.34; H, 7.11; N, 15.60. Found: C, 71.19; H, 7.04; N, 15.65.

EXAMPLE 2

*Preparation of 4-acetyl-9-formamido-7-methyl-$\Delta^{10}$-ergolene*

A solution of 5 g. of 9-hydroxy-7-methyl-$\Delta^{10}$-ergolene in 100 ml. of ethanol is treated with 10 ml. of acetic anhydride. The reaction mixture is allowed to stand at room temperature for about two hours. The volatile portions of the reaction mixture are then removed by evaporation in vacuo and the residue, comprising 4-acetyl-9-hydroxy-7-methyl-$\Delta^{10}$-ergolene, is taken up in warm ethyl acetate. The 4-acetyl-9-hydroxy-7-methyl-$\Delta^{10}$-ergolene separates in crystalline form, and is removed by filtration. The substance melts with decomposition at about 182–184° C.

To a suspension of 5 g. of 4-acetyl-9-hydroxy-7-methyl-$\Delta^{10}$-ergolene in 500 ml. of liquid hydrogen cyanide, are added slowly and while cooling in an ice bath 200 ml. of boron trifluoride etherate. The reaction mixture is maintained at about 25° C. for about twenty hours and thereafter is concentrated by evaporation in vacuo to a thick syrupy residue. The residue is mixed with 100 ml. portions of water and chloroform, and the mixture is neutralized with solid sodium bicarbonate. The chloroform phase of the mixture is separated, and the aqueous layer is extracted twice with 100 ml. portions of chloroform. The combined chloroform solutions are dried over anhydrous magnesium sulfate and the chloroform is removed by distillation. The residue, consisting of 4-acetyl-9-formamido-7-methyl-$\Delta^{10}$-ergolene, is crystallized from about 50 ml. of warm methanol. After recrystallization from a mixture of dimethylformamide and methanol, 4-acetyl-9-formamido-7-methyl-$\Delta^{10}$-ergolene melts with decomposition at about 225–226° C.

*Analysis.*—Calculated for $C_{18}H_{21}N_3O_2$: C, 69.43; H, 6.80; N, 13.50. Found: C, 69.11; H, 6.92; N, 13.44.

A solution of 5.0 g. of 4-acetyl-9-hydroxy-7-methyl-$\Delta^{10}$-ergolene hydrochloride in 70 ml. of concentrated hydrochloric acid is kept at 25° C. for about two hours. The excess of hydrochloric acid is removed by evaporation in vacuo, and the residue is neutralized with aqueous 5 percent sodium bicarbonate. The neutral solution is extracted with three 100 ml. portions of chloroform, and the combined chloroform extracts are dried over magnesium sulfate. The chloroform is removed by distillation in vacuo, and the residue, consisting of 4-acetyl-9-epi-hydroxy-7-methyl-$\Delta^{10}$-ergolene, is crystallized from warm ethyl acetate. The substance melts with decomposition at about 194–196° C.

When 4-acetyl-9-epi-hydroxy-7-methyl-$\Delta^{10}$-ergolene is used in the above procedure, 4-acetyl-9-formamido-7-methyl-$\Delta^{10}$-ergolene is obtained, which melts with decomposition at about 227–228° C. A mixed melting point with this product and that obtained in the above procedure shows no depression.

EXAMPLE 3

*Preparation of 4-acetyl-9-amino-7-methyl-$\Delta^{10}$-ergolene*

A mixture of 0.5 g. of 4-acetyl-9-formamido-7-methyl-$\Delta^{10}$-ergolene and 10 ml. of anhydrous hydrazine is refluxed for about one hour. To this reaction mixture are added slowly about 5 ml. of water, and refluxing is continued for about fifteen minutes. The solution is evaporated to dryness under reduced pressure and the residue is crystallized from a mixture of methanol and ether. After recrystallization from water, the 4-acetyl-9-amino-7-methyl-$\Delta^{10}$-ergolene thus prepared melts with decomposition at about 178–179° C.

*Analysis.*—Calculated for $C_{17}H_{21}N_3O$: C, 72.05; H, 7.47; N, 14.83. Found: C, 71.53; H, 7.50; N, 14.95.

EXAMPLE 4

*Preparation of 9-amino-7-methyl-$\Delta^{10}$-ergolene*

A solution of 5 g. of 9-formamido-7-methyl-$\Delta^{10}$-ergolene in 125 ml. of concentrated hydrochloric acid is refluxed under nitrogen for about four hours. The reaction mixture is decolorized by treatment with activated carbon, and after removal of the carbon is concentrated by evaporation in vacuo. As the volume is diminished a thick slurry of crystals of 9-amino-7-methyl-$\Delta^{10}$-ergolene trihydrochloride is deposited and removed by filtration and washed with alcohol and ether. The crystalline precipitate is recrystallized from aqueous ethanol.

9-amino-7-methyl-$\Delta^{10}$-ergolene trihydrochloride thus prepared melts with decomposition at about 303–305° C.

*Analysis.*—Calculated for $C_{15}H_{19}N_3 \cdot 3HCl$: C, 51.32; H, 6.32; N, 11.92. Found: C, 51.21; H, 6.31; N, 11.69.

When the foregoing procedure is repeated, but refluxing a mixture of 2 g. of 4-acetyl-9-formamido-7-methyl-$\Delta^{10}$-ergolene in 50 ml. of concentrated hydrochloric acid for eighteen hours, 9-amido-7-methyl-$\Delta^{10}$-ergolene trihydrochloride is obtained, melting with decomposition at about 291–292° C.

A solution of 2.3 g. of 9-amino-7-methyl-$\Delta^{10}$-ergolene trihydrochloride in about 50 ml. of water is treated with an excess of solid sodium bicarbonate. A crystalline precipitate of 9-amino-7-methyl-$\Delta^{10}$-ergolene forms and is removed by filtration and washed successively with portions of water, methanol and ether. After recrystallization from ethyl acetate the 9-amino-7-methyl-$\Delta^{10}$-ergolene thus prepared melts at about 165–166° C.

*Analysis.*—Calculated for $C_{15}H_{19}N_3$: C, 74.65; H, 7.94; N, 17.41. Found: C, 74.43; H, 7.64; N, 17.43.

A mixture of 2.5 g. of 4-acetyl-9-amino-7-methyl-$\Delta^{10}$-ergolene, 5.6 g. of potasium hydroxide and 100 ml. of water is refluxed under nitrogen for about seventeen hours. The resulting solution is cooled whereupon a crystalline precipitate of 9-amino-7-methyl-$\Delta^{10}$-ergolene forms. The precipitate is removed by filtration and washed with water. After drying, the 9-amino-7-methyl-$\Delta^{10}$-ergolene thus prepared melts at about 165–166° C. A mixed melting point with the product obtained from the treatment of 9-amino-7-methyl-$\Delta^{10}$-ergolene trihydro-

EXAMPLE 5

*Preparation of 7-methyl-4-(3',4',5'-trimethoxybenzoyl)-9-(3',4',5'-trimethoxybenzamido)-Δ¹⁰-ergolene*

To a solution of 0.88 g. of 9-amino-7-methyl-Δ¹⁰-ergolene in 11 ml. of pyridine are added 0.88 g. of 3,4,5-trimethoxybenzoylchloride. The reaction mixture is kept at about 0° C. for about seventeen hours and then poured into about 50 ml. of saturated aqueous sodium bicarbonate solution. The resulting mixture is extracted with three successive 50 ml. portions of chloroform, the extracts are combined, washed with water and dried over anhydrous magnesium sulfate. The chloroform is then removed by evaporation in vacuo and the residue crystallized from the minimum amount of warm methanol. After recrystallization from a mixture of dimethylformamide and methanol, the 7-methyl-4-(3',4',5' - trimethoxybenzoyl) - 9 - (3',4',5' - trimethoxybenzamide)-Δ¹⁰-ergolene which is formed under the conditions of reaction melts with decomposition at about 275–280° C.

*Analysis.*—Calculated for $C_{35}H_{39}N_3O_8$: C, 66.76; H, 6.24; N, 6.67. Found: C, 66.93; H, 6.30; N, 6.48.

EXAMPLE 6

*Preparation of 9-acetamido-4-acetyl-7-methyl-Δ¹⁰-ergolene*

A suspension of one gram of 4-acetyl-9-hydroxy-7-methyl-Δ¹⁰-ergolene in 50 ml. of acetonitrile is cooled in an ice bath while 20 ml. of redistilled boron trifluoride etherate are added with stirring. After addition of the boron trifluoride is completed, the reaction mixture is maintained at room temperature for about twenty-one hours and then is evaporated in vacuo on a hot water bath until a slurry of white crystalline material is formed. To this residue are added 50 ml. of water, and the resulting solution is made neutral with sodium bicarbonate. The neutral solution is extrated with three successive 50 ml. portions of chloroform, the combined chloroform extracts are washed twice with water, dried over anhydrous sodium sulfate and concentrated to small volume by evaporation in vacuo. A light yellow amorphous residue is obtained which crystallizes readily when triturated with ethyl acetate. The crystalline precipitate is removed by filtration and recrystallized from aqueous methanol. 9-acetamido-4-acetyl-7-methyl-Δ¹⁰-ergolene thus prepared melts with decomposition at about 212–214° C.

EXAMPLE 7

*Preparation of 4-acetyl-9-benzamido-7-methyl-Δ¹⁰-ergolene*

A suspension of one gram of 4-acetyl-9-hydroxy-7-methyl-Δ¹⁰-ergolene in 20 ml. of benzonitrile is treated with 20 ml. of redistilled boron trifluoride etherate, and the reaction mixture is warmed gently on the steam bath until it becomes homogeneous. The reaction mixture is then permitted to stand at room temperature for about twenty-two hours and thereafter is concentrated by evaporation in vacuo to a viscous liquid. This residue is treated with a mixture of about 20 ml. of water, 20 ml. of methanol and 100 ml. of chloroform, and the mixture is neutralized with sodium bicarbonate. The organic phase of the mixture is separated, washed with water, and treated with activated carbon. After removal of the carbon, the solution is concentrated under reduced pressure to a pale yellow amorphous solid residue. After several recrystallizations from aqueous methanol, the 4-acetyl-9-benzamido-7-methyl-Δ¹⁰-ergolene thus prepared melts with decomposition at about 228–229° C.

*Analysis.*—Calculated for $C_{19}H_{23}N_3O_2$: C, 74.39; H, 6.50; N, 10.85. Found: C, 75.01; H, 6.67; N, 10.67.

chloride with sodium bicarbonate shows no depression of the melting point.

EXAMPLE 8

*Preparation of 9-acetamido-4-acetyl-7-methyl-Δ¹⁰-ergolene*

To 10 ml. of acetic anhydride are added 0.4 g. of 9-amino-7-methyl-Δ¹⁰-ergolene and the solution is kept at about 25° C. for about thirty minutes. The excess of acetic anhydride is then removed by evaporation in vacuo, and the residue from evaporation is crystallized from a mixture of methanol and ether.

After recrystallization from aqueous methanol, the 9-acetamido-4-acetyl-7-methyl-Δ¹⁰-ergolene thus prepared melts with decomposition at about 215–217° C.

*Analysis.*—Calculated for $C_{19}H_{23}N_3O_2$: C, 70.13; H, 7.12; N, 12.91. Found: C, 69.78; H, 7.27; N, 12.87.

EXAMPLE 9

*Preparation of 9-acetamido-7-methyl-Δ¹⁰-ergolene*

The process of Example 6 is repeated, except that 9-hydroxy-7-methyl-Δ¹⁰-ergolene is used. After extraction of the neutralized reaction mixture with chloroform and evaporation of the resulting chloroform extract, the amorphous residue is crystallized from aqueous methanol. After recrystallization from warm aqueous methanol, the 9-acetamido-7-methyl-Δ¹⁰-ergolene which is prepared melts at about 230–232° C.

When 9-acetamido-7-methyl-Δ¹⁰-ergolene is treated with acetic anhydride according to the procedure of Example 8, 9-acetamido-4-acetyl-7-methyl-Δ¹⁰-ergolene is formed, melting at about 215–217° C. after recrystallization from aqueous methanol.

EXAMPLE 10

*Preparation of 9-acetamido-4-acetyl-7-methyl-Δ¹⁰-ergolene from 4-acetyl-9-amino-7-methyl-Δ¹⁰-ergolene*

To 10 ml. of acetate anhydride are added about 0.5 g. of 4-acetyl-9-amino-7-methyl-Δ¹⁰-ergolene prepared according to the procedure of Example 3. The solution is kept at about room temperature for about thirty minutes, and the excess of acetic anhydride is then removed by evaporation in vacuo. The residue, comprising the 9-acetamido-4-acetyl-7-methyl-Δ¹⁰-ergolene formed in the reaction, is crystallized from a mixture of methanol and ether.

After recrystallization from aqueous methanol, 9-acetamido-4-acetyl-7-methyl-Δ¹⁰-ergolene thus prepared melts with decomposition at about 215–217° C. and a mixed melting point determination with the product of Example 8 shows no depression of the melting point.

We claim:

1. A compound selected from the group consisting of 9-amino-7-methyl-Δ¹⁰-ergolene represented by the formula

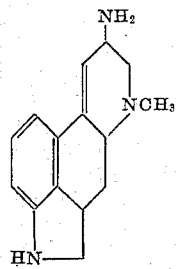

and its N-substituted lower alkyl carboxyacyl and monocarbocyclic aromatic corboxyacyl derivatives.

2. 9-amino-7-methyl-Δ¹⁰-ergolene.
3. 4-acetyl-9-amino-7-methyl-Δ¹⁰-ergolene.
4. 9-acetamido-4-acetyl-7-methyl-Δ¹⁰-ergolene.
5. 4-acetyl-9-benzamido-7-methyl-Δ¹⁰-ergolene.
6. 7 - methyl - 4 - (3',4',5'-trimethoxybenzoyl) - 9 - (3',4',5'-trimethoxybenzamido)-Δ¹⁰-ergolene.
7. A compound selected from the group consisting of 9-formamido-7-methyl-$\Delta^{10}$-ergolene and its N-substituted lower alkyl carboxyacyl and monocarbocyclic aromatic carboxyacyl derivatives.
8. 9-formamido-7-methyl-$\Delta^{10}$-ergolene.
9. 4-acetyl-9-formamido-7-methyl-$\Delta^{10}$-ergolene.

References Cited in the file of this patent

Kornfeld et al.: Jour. Am. Chem. Soc., vol. 78, pages 3087–3114 (1956).